Sept. 6, 1960 J. EIGEMAN 2,951,957
SYNCHRONOUS MOTOR
Filed Nov. 22, 1957 2 Sheets-Sheet 1

INVENTOR.
JACOBUS EIGEMAN
BY
*Frank R. Lufari*
AGENT.

Sept. 6, 1960 J. EIGEMAN 2,951,957
SYNCHRONOUS MOTOR

Filed Nov. 22, 1957 2 Sheets-Sheet 2

INVENTOR.
JACOBUS EIGEMAN
BY
AGENT.

United States Patent Office 2,951,957
Patented Sept. 6, 1960

2,951,957
SYNCHRONOUS MOTOR

Jacobus Eigeman, Drachten, Netherlands, assignor to North American Philips Company, Inc., New York, N.Y., a corporation of Delaware Filed Nov. 22, 1957, Ser. No. 698,106

7 Claims. (Cl. 310—164)

This invention relates to synchronous electric motors of the type having a toroidal field coil concentrically arranged with respect to a permanent-magnet, multi-pole rotor.

The main object of this invention is to make a simple, synchronous, self-starting motor, for use in clocks and the like, which will be as silent as possible in operation. In addition, the motor must have the property to start in only one direction.

The motor that fulfills this object has a toroidal rotor of a permanent magnetic material having a high coercive force so that its periphery can be magnetized with a number of evenly-spaced poles of opposite polarity side-by-side. The rotor is affixed to an axial shaft and is surrounded by a stator structure that includes a toroidal field coil surrounding, and in the same plane with, the rotor. The field coil is encased in a shell of magnetically soft material. This shell includes a number of magnetically soft poles which extend at least part of the way through the axial length of the coil from opposite ends and serve as stator poles which are energized by the coil.

One of the chief distinguishing features of the invention is the fact that more of these poles extend into the coil from one side than from the other. These poles are straight and parallel to each other and are arranged around a single circle slightly smaller than the inner dimensions of the coil and slightly larger than the periphery of the rotor. The poles are divided into groups with the poles in each group being substantially evenly spaced but with the groups being unevenly spaced from adjacent groups. Because of the fact that there are more poles on one side than the other, at least two diametrically opposite groups of poles extending from one side of the coil have one less pole than corresponding groups extending from the other side.

Another distingiushing feature is the shape of the novel shading members, which are relatively thick plates usually of copper. The outer periphery of each shading member is in the form of a circular disk with a pair of diametrically opposite annular sectors removed. The diameter of the disk in the region from which the annular sectors have been removed is smaller than the circle on which the stator poles lie. The major part of the disk has a diameter greater than the pole circle and has holes in it for the individual poles of some of the groups to slide through so that the disk may be slipped over these latter poles and in surface-to-surface contact with end plates of the shell. These shading members act like short-circuited turns to shade the flux in those poles which pass through the holes in them. This shading is a delay of the build-up of magnetic flux in the shaded poles with respect to the flux in those poles lying in annular sectors.

The invention will be more completely described in connection with the drawings, in which.

Figure 1:
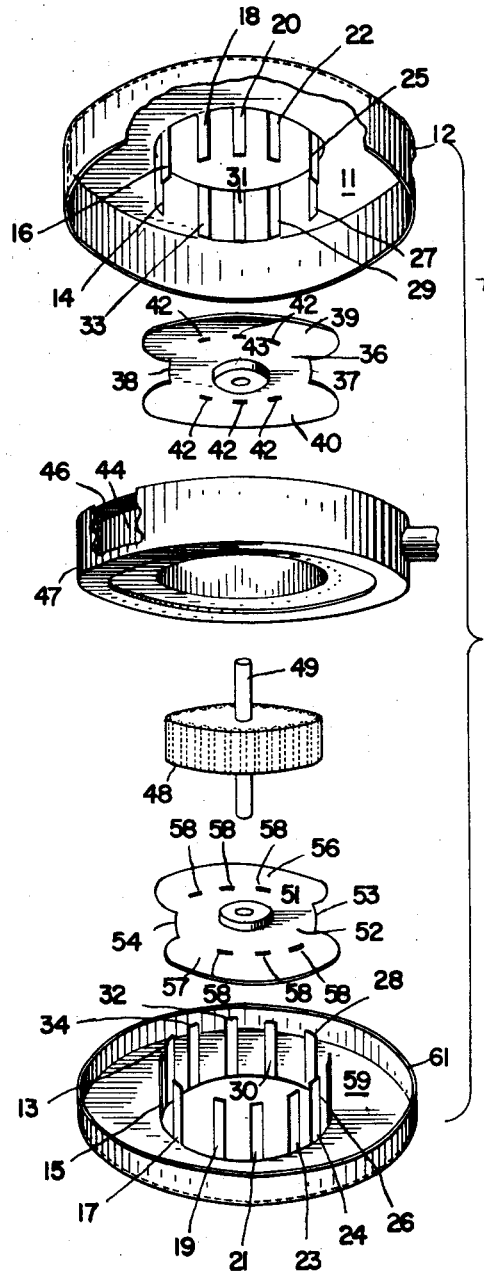
Fig. 1 shows an exploded view of all of the elements of the motor.

In Fig. 1 the uppermost member is end plate 11 in the form of an annular disk of magnetically soft material, such as cold rolled steel or the like. An outer rim 12 of magnetically soft material encircles the periphery of end plate 11, and a plurality of magnetically soft stator poles extend from the perimeter of the central opening in the disk 11. These poles are arranged in alternate groups of two and three, poles 14 and 16 being one group of two and poles 25 and 27 being the diametrically opposite group of two. Poles 18, 20 and 22 constitute one of the groups of three and poles 29, 31 and 33 constitute the diametrically opposite group of three. The precise spacing between these poles and between the groups will be discussed more completely in connection with other figures of the drawing.

Preferably, all of the stator poles are formed out of the material at the center of disk 11 when the remainder of that material is stamped out so as to leave radially inwardly extending fingers. These fingers are then bent substantially perpendicular to the plane of disk 11, as shown. The rim 12 is also preferably formed from the same sheet of material by means of a pressing or drawing operation.

Immediately below the upper end member is a shading member 36 which may be described as butterfly-shaped. More accurately, shading member 36 may be described as a disk of relatively highly conductive material, such as copper, from which opposite annular sectors have been removed so as to leave circular portions 37 and 38 which are somewhat smaller than the inner diameter of the stator poles extending from end plate 11. The larger diameter sectors 39 and 40 of the shading member 11 are provided with two groups of three apertures 42 to coincide with the two groups of three stator poles each extending from end plate 11 so that the shading member may be slipped over the stator poles with the group of three extending through apertures 42 and the groups of two lying in the space adjacent portions 37 and 38. The purpose of the shading member is to form a short-circuited low resistance turn around the root portion of each stator pole in both groups of three without forming similarly short circuited turns around the poles in groups of two. The result is that magnetic flux in the poles in the groups of three is delayed in being built up with respect to the build-up of flux in the poles in groups of two. A bearing 43 is located at the center of the shading member 36.

Magnetic flux is induced in stator poles by means of a toroidal field coil 44 wound on a bobbin 46. If desired, the outer edges of bobbin 46 may be cushioned by a resilient sleeve 47 of rubber or a similar synthetic material.

Immediately below the coil 44 is a rotor consisting of a magnetically hard cylindrical member 48 having a high coercivity so that individual areas, as indicated by the dotted lines may be magnetized with adjacent poles of opposite magnetic polarities. Cylinder 48 may be made of ceramic ferromagnetic materials or the like, so that the magnetized areas need not extend from the periphery of the cylinder. The magentized areas form non-salient poles, which, because of their non-saliency, do not catch the air and therefore do not make the noise that salient pole rotors do. The rotor is supported on a shaft 49, which, in turn, is supported at one end by bearing 43 in the shading member 36 and at the other end by a bearing 51 in shading member 52.

Shading member 52 is similar to, but not necessarily identical with, shading member 36 in that it is a flat disk of copper, or the like, from which opposite annular sectors have been removed leaving sections 53 and 54 of reduced diameter. The remaining sections 56 and 57 each have apertures 58 therein similar to apertures 42 in the shading member 36. The difference between shading members 36 and 52 stems from the difference in the arrangement of stator poles on the end of plate 11 and the stator poles on the end of plate 59 shown immediately below the shading member 52. In addition, either or both of the shading members may be made up of several sheets of conductive material instead of just one sheet.

End plate 59 is also of magnetically soft material and is provided with a shallow rim 61 and a plurality of stator poles extending from the perimeter of the central opening in the end plate 59. Unlike the stator poles of end plate 11, the stator poles of end plate 59 are twelve in number and are divided into four groups, each consisting of three stator poles. The group consisting of stator poles 13, 15 and 17 is diametrically opposite the group consisting of stator poles 24, 26 and 28, while the group consisting of stator poles 19, 21 and 23 is diametrically the opposite of the group consisting of stator poles 30, 32 and 34. It will be noted that the latter two groups pass through the apertures 58 in shading member 52. The former two groups lie adjacent the sections 53 and 54 of reduced diameter. Thus the groups consist of poles 19, 21 and 23 and poles 30, 32 and 34 are shaded poles while the other two groups are unshaded poles.

Figure 2:
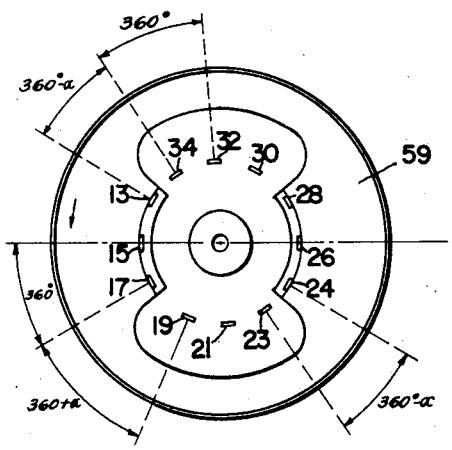
Fig. 2 shows a cross-sectional view of the motor looking at one of the end plates and its associated shading member.

The angular spacing of the poles in the lower end of plate 59 may be seen more clearly in Fig. 2 which shows a plan view of end plate 59 and the shading member 52. Within each of the four groups of stator poles, spacing between poles is indicated as 360°. This means electrical degrees, not geometrical degrees, and will become more apparent in connection with Fig. 5. The spacing between poles 13 and 34 and between poles 23 and 24 is 360°.—α and α also will be discussed in connection with Fig. 5. The spacing between poles 17 and 19 and the diametrically opposite poles 28 and 30 is 360°.+α.

Figure 3:
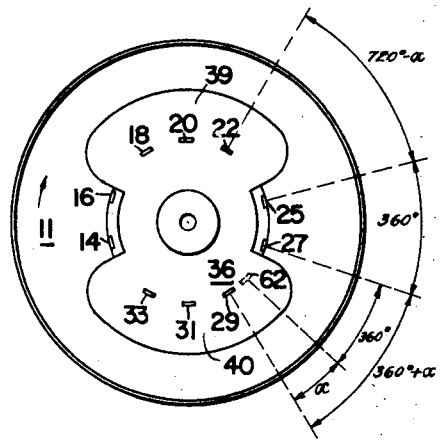
Fig. 3 shows a cross-sectional view of the motor looking at the other annular plate and its associated shading member.

The spacing of the stator poles on the upper end plate 11 is shown in Fig. 3 which shows end plate 11 and shading member 36 in plan view. Here the spacing between poles 14 and 16 and between poles 25 and 27 is 360°. This means that these poles in the groups of two are spaced apart by the same physical distances as are the poles in each of the groups in Fig. 2.

Fig. 3 clearly shows the smaller size of the removed annular sectors which result from having poles in groups of two. If the unshaded poles, for example, in the groups consisting of poles 25 and 27 included three poles rather than two, the third pole would have to lie in location 62, as indicated by the dotted line. This would mean that the spacings between the centers of poles 29 and 62 would be equal to the angle α and furthermore that the sectors of shading member 36 from which annular sectors have been removed would be much larger so that the edge of sector 40 could lie between poles 29 and 62. This would mean that the cross-sectional area of the shading member in that narrow region would be relatively small and, as a consequence, its resistance would be relatively high, with the result that the shading of pole 29 might not be sufficient. In addition, because of the fact that the stator poles are formed out of material which was originally in the central part of disk 11, poles 29 and 62 lying so close together and on the same root circle would have to be made out of the same piece of material, which is obviously impossible. As a result, one or the other of these poles would have to be wedge shaped. For this and other reasons, it was discovered and is a feature of this invention that the pole in position 62 (and the diametrically opposite position) may be omitted altogether without undue deleterious effects on the operation of the motor.

Figure 4:
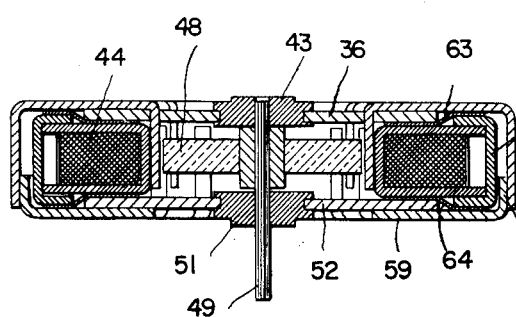
Fig. 4 shows a cross-sectional view of the complete motors.

Fig. 4 shows a cross section view of the complete motor with the elements of Fig. 1 assembled together. It will be noted that the rim 12 of the upper end plate 11 slips over the rim 61 of the lower end plate 59. The only elements shown in Fig. 4 that are not shown in Fig. 1 are a pair of annular disks 63 and 64 of flexible insulating and packing material.

Figure 5:
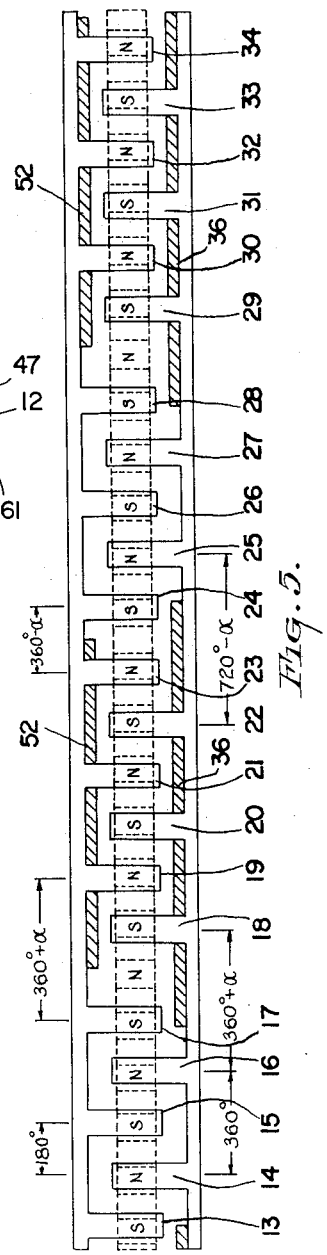
Fig. 5 shows a developed view of the stator poles.

Fig. 5 is a developed view showing the spacing of the stator poles. Overlaid on these stator poles is a series of dotted rectangles indicating the approximate positions of the N and S pole sections of the rotor 48. When the power is removed from coil 44, the permanently magnetized rotor comes to rest in such a position as to neutralize the force attracting each of the magnetized areas to the closest of the stator poles which are unmagnetized. The rotor will thus come to rest either with the rotor poles approximately as shown or with the rotor poles 180° displaced, i.e., with a N pole where each S pole is now located and vice versa.

It will be seen that the stator pole relationship is such that the poles interleave in numerical order from 13 through 34, there being 22 poles altogether. It is now apparent that the annular spacing between poles indicated as 180° is the angular spacing as between the center of an adjacent pair of N and S poles on the rotor. This is the basic angular measure.

Because of the fact that the magnetic field of coil 44 induces, at any one instant, opposite magnetic fluxes in the stator poles extending from end plate 11 and end plate 59, when pole 13 is a north pole, pole 14 must be a south pole. Assuming this to be the condition at the instant power is applied to the field coil, the rotor indicated by the dotted lines in Fig. 5 would be pulled to the right, for the magnetic flux induced in the stator poles 13 to 17 and 24 to 28 would increase the attraction of these poles for the nearest rotor poles. Because of the fact that currents induced in the shading members 36 and 52, shown in cross sectional form, opposes the build-up of flux in those poles which the shading members encircle, magnetic flux is relatively smaller in such poles at the beginning, and so the only force which attracts the closest rotor poles to these shading poles 18 to 23 and 29 to 34 is simply the flux of the rotor poles alone, which is not as strong as the combined flux of the rotor poles and the unshaded stator poles.

While the above starting operation represents one possible set of initial conditions, it will be recognized that there are many others. In addition to the fact that there are two principal positions in which the rotor may stop, i.e., either as shown in Fig. 5, or with the N and S poles reversed, the alternating voltage applied to coil 44 may have any value between its negative maximum and its positive maximum at the instant it is connected to the coil, and, furthermore, it may be on the increasing or decreasing part of a cycle. However, it is not necessary to consider an infinite number of starting possibilities for the motor because the well-known laws of transient analysis indicates that the initial current in coil 44 will always be zero and will build up more or less slowly in either the positive or negative polarities, depending upon the particular time in the alternating current cycle when the coil 44 is connected to the energizing supply source. Furthermore, the magnetic flux in the unshaded stator poles bears a known relationship to the energizing current and the magnetic flux in the shaded stator poles bears yet another known relationship to the flux in the unshaded poles. The result of these relationships is that no matter at which point in the cycle the field coil 44 is first energized and no matter what the initial position of the rotor 48 may be, the rotor has the property to start in only one direction.

It has been found that the delay of build-up of flux in the shaded poles is such that these poles reach their maximum flux when the unshaded poles have passed approximately 45 electrical degrees beyond maximum i.e., when the flux in the unshaded poles becomes reduced to about .7 times the maximum flux in the unshaded poles. This delay of 45° is not a hard and fast figure but is variable over a limited range from approximately 30 to 60°. However, it is usually in the range of 40 to 45°. The significance of this delay angle is that the angle α indicated in Figs. 2, 3 and 5 is equal to 180°−α, whereby α is measured in the direction of the flux displacement of the shaded poles, i.e., in the direction of rotation of the rotor. It has been known heretofore that grouping the stator poles of a motor of this general type and shifting the positions of the shaded stator poles relative to the preceding unshaded poles of the same magnetic polarity through an angle of 180°−α, results in a relatively smoother running motor. However, in addition to this preferred mode of operation the present invention incorporates a simplified stator structure which is easy to assemble.

Finally it should be noticed that all of the stator poles are of approximately the same axial length. This means that no flux will be shorted out by using extra long stator poles, as has been the practice heretofore. Instead, the present invention achieves the result of these extra-long stator poles, i.e., equlization of the shaded and unshaded magnetic fluxes by providing more shaded poles than unshaded poles.

Further modification in the invention may occur to those skilled in the art and it is therefore contemplated that the invention extends to all modifications within the scope of the following claims.

What is claimed is:

1. An electric motor comprising: a permanently magnetized rotor having a number $n$ of pole pairs spaced about the perimeter thereof; a first ferromagnetically soft stator end member; a number $n$ of ferromagnetically soft first poles extending from said end member in one direction, said first poles being arranged into an even number of diametrically opposite groups spaced around a circle slightly larger than the perimeter of said rotor, adjacent poles of each of said groups being spaced at 360 electrical degrees from each other, at least one pair of said diametrically opposite groups comprising shaded poles and at least one other pair of said diametrically opposite groups comprising unshaded poles, one end pole of a shaded group and the adjacent end pole of an unshaded group and corresponding diametrically opposed adjacent poles being spaced at 360+α electrical degrees from each other and the other end pole of said shaded group and the adjacent end pole of an unshaded group and corresponding diametrically opposed adjacent poles being spaced at 360−α electrical degrees from each other, where α is measured in the direction of rotation of said rotor and is equal to 180 degrees minus the delay in degrees of build up of flux in the shaded poles; a second ferromagnetically soft stator end member substantially parallel to said first end member and spaced therefrom in the direction of said first poles; a number $m$, $m$ being less than $n$, of ferromagnetically soft second poles extending from said second end member in the direction of said first end member, said second poles being arranged in an even number of diametrically opposite groups spaced around a circle of substantially the same diameter as said first-named circle, the number of groups into which said second poles are divided being equal to the number of groups into which said first poles are divided and the individual poles of each group of said second poles being interspaced with poles of corresponding groups of said first poles, at least one pair of said diametrically opposite groups of said second poles having at least one less pole than the corresponding groups of said first poles, adjacent poles of each of said last-mentioned pair of groups being spaced at 360 electrical degrees from each other; a first shading member encircling the root portion of each of said shaded poles of said second poles, one end pole of at least one of said last-mentioned pair of groups and the adjacent end pole of a shaded group being spaced at 360+α electrical degrees from each other and the other end pole of the said one group and the adjacent end pole of a shaded group being spaced at 720−α electrical degrees from each other, where α is measured in the direction of rotation of said rotor and is equal to 180 degrees minus the delay in degrees of build up of flux in the shaded poles; and a toroidal coil surrounding all of said salient poles.

2. A motor as set forth in claim 1 in which said first poles are divided into four groups of three poles each and said second poles are divided into two diametrically opposite groups of three poles each and two diametrically opposite groups of two poles each.

3. A motor as claimed in claim 2 in which said second poles are divided into two diametrically opposite groups of three shaded poles each and two diametrically opposite groups of two unshaded poles each.

4. A motor as claimed in claim 2 in which all of said poles are of the same length.

5. The motor of claim 1 in which said first and said second shading member each comprise a highly conductive non-magnetic sheet of material having holes therein to allow each pole of two diametrically opposite groups of poles extending from said first end plate to pass through, said sheet being in a generally circular form with opposite annular sectors removed so that the diameter of said sheet where said sectors are removed is less than the internal diameter of the circle of poles of first end member.

6. A motor as set forth in claim 5 in which the diametrically opposite annular sectors removed from said second shading member have an arcuate length sufficient to include only two poles each.

7. A motor as set forth in claim 5 in which each of said shading members is attached to one of said end members and includes a bearing having a central aperture therein supporting said rotor.

References Cited in the file of this patent

UNITED STATES PATENTS

| | | |
|---|---|---|
| 1,933,591 | Holtz et al. | Nov. 7, 1933 |
| 1,977,184 | Haydon | Oct. 16, 1934 |
| 2,234,420 | Traeger | Mar. 11, 1941 |
| 2,543,816 | Walworth | Mar. 6, 1951 |
| 2,665,389 | Landgraf et al. | Jan. 5, 1954 |